United States Patent Office 3,351,675
Patented Nov. 7, 1967

3,351,675
RESINOUS COATING MATERIALS
Allan E. Gilchrist, Westlake, Ohio, assignor to Ford Motor Company, Dearborn, Mich., a corporation of Delaware
No Drawing. Filed Jan. 10, 1966, Ser. No. 519,523
7 Claims. (Cl. 260—845)

ABSTRACT OF THE DISCLOSURE

A phenolic resin-extended polycarboxylic acid resin, the product of heating together 50–95 weight parts of a maleinized siccative hydrocarbon-comprising conjugated diene copolymer having an acid number of at least 30 and 5–50 weight parts of an oil soluble nonheat reactive phenolaldehyde resin at a temperature between about 400° F. and about 500° F. for at least about 30 minutes. This product has particular utility as a film-forming coating material of the paint binder resin type for electrically induced deposition from an aqueous bath.

---

This application is a continuation-in-part of my copending application Serial No. 186,320, filed Apr. 10, 1962, which in turn was copending with and is a continuation-in-part of my application Serial No. 132,303, filed Aug. 18, 1961, and now abandoned. The disclosures of these applications are incorporated herein by reference.

This invention relates to the art of coating. In particular, this invention relates to novel polycarboxylic acid resins suitable for use as film-forming coating materials and/or binder resins for particulate solids in a coating process wherein an electrically conductive object is coated by electrically induced deposition of a polycarboxylic acid resin from an aqueous bath.

Advantages of this invention over prior practice include prolonged stability of the extended resin composition and paints, enamels, lacquers, etc., containing same in a use such as the aforementioned electrically induced deposition process. This promotes uniformity and homogeneity of the extended resin and gives longer practical operating times.

Broadly, my improvement for extending a maleinized siccative hydrocarbon comprising polymer with a phenol-aldehyde condensation product comprises blending said acid resin with nonheat reactive phenol-aldehyde resin at a temperature between about 400° F. and about 500° F. for at least about 30 minutes.

The heating together, preferably with agitation such as stirring, of the polycarboxylic acid resin and the phenolic resin for at least about a half hour, and preferably about one to about two hours or more, appears to give a chemical bonding between these components and no free phenolic resin appears to remain. Thus, when the resin is used in a coating operation such as electrically induced deposition from an aqueous bath, the coating is essentially homogeneous and in a bath containing the resulting resin product there is no appreciable build-up of free phenolic bodies dissociated from the resin in an appreciable operating time.

The phenolic resins useful in my process are "nonheat reactive" in the ordinary sense used in that art, in other words, they will not polymerize substantially when aged at about 150° F. to about 180° F. Typically, the mole ratio of phenol or hydrocarbyl-substituted phenol to formaldehyde in making them up is between about 0.6 and about 1.2. The condensation can be made in conventional manner such as acid condensation. The "phenol" used can be monohydroxybenzene, a substituted phenol such as one with alkyl or phenyl substitution, cresol, related polyhydroxy aromatics such as resorcinol, catechol and their hydrocarbyl-substituted derivatives, and mixtures of the foregoing. Preferred phenols include $C_4$–$C_8$ alkyl phenols, typically amyl phenol and para tertiary butyl phenol, and para phenyl phenol. To obtain a resin of highest quality, the condensation product can be steam-stripped to rid the resin of free phenol and/or low molecular weight substances.

The proportion of phenolic resin for blending with the acid resin preferably is about 15 to about 35% to impart special salt spray resistance to the resulting cured resin after its electrodeposition as, for example, on a steel panel. The use of substantially less than 5% phenolic resin in the reaction mixture can be helpful, but is not as practical for achieving this end. The use of substantially more than about 50% of phenolic resin in the resin mixture gives a resulting resinous product which is often difficult to disperse in water or render water soluble therein by amine neutralization. Hence, it should be avoided unless there are sufficient free hydroxyl groups on the resulting blended resin contributed by the phenolic resin component to give good water solubility characteristics.

It is essential to use a phenolic resin that is nonheat reactive in my process so that the resulting blended material will not tend to polymerize in normal storage, handling, or use, and thereby change uncontrollably in characteristics.

In the blending operation with the acid resin use of a temperature as high as about 350° F. does not appear to unite the resins in a practical time to prevent phenolic resin separation, as will be shown in the examples which follow. On the other hand, the use of blending temperatures substantially above about 500° F. causes substantial bodying of the resin blend and can even lead to gelation. Such resins will not disperse well in water when neutralized with an amino compound. The low limit of blending time of one-half hour is a practical one to insure adequate union of the resins. A one-hour blending time is preferred but even longer times can be used, e.g. 2–4 hours or more, provided that some increase in viscosity can be tolerated in the resulting blended resins.

In the practice of my invention the preferred acid resins have electrical equivalent weight between about 1000 and about 20,000. The term "electrical equivalent weight" is employed herein in accordance with the definition and use of such term in my U.S. Patent 3,230,162, such definition and the accompanying description of method for determining same being incorporated herein by reference. The preferred acid resins have acid number in the range of about 30 to about 300, preferably between about 30 and about 150, as determined by titration with caustic solution.

Butadiene is the preferred diolefin base material which comprises at least about 50 wt. percent of the hydrocarbon comprising polymer prior to its reaction with maleic anhydride and subsequent blending with the phenol-aldehyde resin in accordance with the method of this invention. A preferred coreactant with butadiene is mesityloxide. The butadiene component may also be reacted with styrene, isoprene, isoprene dimer, isobutylene dimer, etc.

I have found that blending the acid resin with the phenol-aldehyde resin at about 250° to about 380° F. gives a product which in prolonged use in electrocoating bath operations tends to split off phenolic resin or fragments thereof. These increase in concentration in the bath as the coating operation goes on and require eventual premature shut-down of bath operations. This failure in stability appears in deposited resins as unevenness of deposited films and also affects the homogeneity of such films and the "throw" (evenness of deposition on all exposed surfaces of an electrode) in the bath.

The electrocoating baths within which the improved resins of this invention are employed comprise a fluent, intimate, mixture of water, optionally at least one component pigment, film-forming polycarboxylic binder resin, at least a substantial portion of which is an extended acid resin prepared in accordance with the method of this invention, e.g. 15 to 100%, and sufficient water soluble amino compound to maintain the binder resin as a dispersion of anionic polyelectrolyte in said bath.

Electrically induced coating from such baths is carried out at a voltage above the threshold deposition voltage of the coating composition employed, i.e. the voltage at which deposition of the dispersed binder resin or binder resin and pigment codeposition in initiated upon an electrically conductive workpiece when a direct electric current is passed through the bath between the workpiece and a second electrode that is electrically negative in relation to the workpiece, spaced apart from the workpiece, and in electrical contact with the bath. The maximum tolerable voltage is slightly below the rupture voltage of the binder resin employed, i.e. that voltage at which a paint film already laid down by this method ruptures upon continued application of such voltage during the immersion of the workpiece for coating. In some cases this voltage may be as low as about 20 volts but is advantageously between about 50 and about 500 volts, more commonly about 150 to about 300 volts. The bath components are replenished from time to time as needed.

The useful amines in my bath composition and replenishment composition therefor are the water soluble amino compounds as described and set forth in my U.S. Patent 3,230,162, issued January 18, 1966, preferably with 30–60% of the amino equivalents present being contributed by water soluble polyamine. Advantageously, pH of the bath composition is not more than about 8.3 to suppress sorption of $CO_2$ from ambient air, and generally it will be broadly between about 5 and 8.2 at room temperature. Specific resistance of the bath composition as made up is advantageously between about 700 and about 1,000 ohm centimeters to deposit about 25 microns thick as a priming coat, while higher bath resistance gives a thinner film and vice versa. Upon electrodeposition I estimate that the film should have at least about 40,000,000 ohm-centimeters apparent specific resistance to obtain good throw into interstices and limitation of film thickness to comparatively thin values as electrodeposition proceeds. Advantageously, this apparent specific resistance of film is even higher, preferably at least about 75,000,000 ohm-centimeters for films less than 25 microns thick. Such apparent specific resistance includes a surface resistance factor for the bath-deposited film interface and the film-substrate interface.

This invention will be more fully understood from the following illustrative examples. Unless otherwise specified, all percentages herein are weight percentages and all parts are weight parts.

*Example 1*

A water dispersible, phenolic resin extended, maleinized siccative butadiene-comprising polymer is prepared from the following ingredients:

| | Parts by weight |
|---|---|
| 1,3-butadiene-mesityloxide copolymer | 1360 |
| Maleic anhydride | 240 |
| Phenolic resin | 400 |

The copolymer is an isotactic 1,4 addition copolymer of which about 55% is butadiene. It contains about 20–30% of 1,2 addition units (vinyl side chains). The isotactic portions of the copolymer are about 75% trans and about 25% cis configuration.

The phenolic resin is a non-reactive (100%) phenolic oil soluble resin of the para-phenyl-phenol type, e.g. Bakelite Resin CKR-5254, a product of Union Carbide Corp.

The three above listed ingredients are charged to a flask equipped with an agitator, inlet tube for use in providing the charge with a nitrogen blanket and a reflux condenser. A nitrogen blanket of the charge is provided and the charge is heated to above about 400° F. and the charge is maintained at a temperature in the range of about 400° F. to about 425° F. for one hour.

A sample of the resin is removed, cooled and found to be clear and homogeneous. The remainder of the resultant resin is cooled to about 200° F., reduced with water, neutralized with diisopropanol amine at 170°–190° F., agitated for about one-half hour and further diluted with water and aqueous diisopropanol amine to a pH of 7.5 at 5% resin solids.

A control vehicle is prepared in the same manner except that the charge is heated to a maximum temperature of 350° F. and maintained at a temperature in the range of about 325° F. to 350° F. for one hour.

Separate electrocoating baths are formed of aliquots of the exemplary resin blend and of the control.

In the test operations on each coating bath the anodes used are phosphate-treated steel shim stock dipped to expose a square foot of surface to contact with the bath, and the cathode is a 2500 ml. capacity metal tank containing the particular coating bath. Direct current is imposed on the tank cathode and an immersed panel anode from an external circuit using constant current of 2–2.5 amperes per square foot, and the voltage during the resin deposition process on a particular anode is raised by decreasing electrical resistance in the portion of the electrical circuit external to the bath. The voltage is run up to 150 volts, at which time the resulting coated anode is removed from the bath, the excess adhering liquid blown off with air, and the coated anode baked for 10–15 minutes at 380° F. Before baking, the electrically deposited resin film is slightly tacky and tenaciously adhering. After baking, the film is cured. When one anode is coated and withdrawn from the bath another is inserted and the bath is replenished periodically, as the drop below about 2%, with sufficient additional resin dispersion of the same kind except for reduced water content to maintain resin solids content in the bath at about 5%.

After about 45 of the panels have been coated successively in each bath, each bath is dialyzed in the same manner in an external dialyzer using a regenerated cellulose membrane having 48 A. pore size. The used bath is passed into the chamber on one side of the membrane and fresh water on the other at double the flow of the used bath.

Analysis of the material dialyzing from the used bath made with the exemplary resin dispersion shows no phenolic substance, denoting good stability of this resin blend. Analysis of the material dialyzed from the used bath made with the control indicates that significant amounts of the phenolic resin have dissociated and migrated through the dialysis membrane as low molecular weight phenolic material.

The coated panels are subjected to conventional salt spray test (fog of 3% sodium chloride solution sprayed on the panels in a cabinet maintained at 90° F.). The panels coated with the exemplary resin show the greater corrosion resistance as the tests extend beyond 168 hours exposure.

*Example 2*

The procedure of Example 1 is repeated except that the maleinized butadiene-containing resin is prepared by first reacting 60 parts by weight butadiene with 40 parts by weight isobutylene dimer and then reacting 100 parts by weight of the resultant resin with 30 parts by weight of maleic anhydride all in accordance with the method disclosed by Sparks et al. in Example 1 of U.S. Patent 2,634,256. This maleinized polymer is then blended with the phenol-aldehyde resin in the manner described in Example 1.

It will be understood by those skilled in the art that this invention is not restricted to the details of the foregoing illustrative examples and that modifications can be made therein within the scope of the invention as set forth in the appended claims.

What is claimed is:

1. A phenolic resin-extended polycarboxylic acid resin consisting essentially of the product of heating together at a temperature between about 400° F. and about 500° F. for at least about 30 minutes in the absence of a source of formaldehyde sufficient to convert said product into an infusible state:
   (a) 50–95 weight parts of a maleinized siccative hydrocarbon-comprising conjugated diene copolymer having an acid number of at least about 30, and
   (b) 5–50 weight parts of an oil soluble, nonheat reactive phenol-aldehyde resin.

2. The phenolic resin-extended polycarboxylic acid resin of claim 1 wherein said hydrocarbon is butadiene and comprises at least about 50 wt. percent of said polymer prior to malenization.

3. The phenolic resin-extended polycarboxylic acid resin of claim 1 wherein said maleinized siccative hydrocarbon-comprising conjugated diene copolymer is a copolymer of butadiene and mesityloxide reacted with maleic anhydride in an amount sufficient to provide the resultant resin with an acid number in the range of about 30 to about 300.

4. The phenolic resin-extended polycarboxylic acid resin of claim 3 wherein said acid number is in the range of about 30 to about 150 and said extended polycarboxylic acid resin contains between 15 and 35 weight percent of said phenol-aldehyde resin.

5. The phenolic resin-extended polycarboxylic acid resin of claim 1 wherein said maleinized siccative hydrocarbon-comprising conjugated diene copolymer is a copolymer of butadiene and isobutylene dimer reacted with maleic anhydride in an amount sufficient to provide the resultant resin with an acid number in the range of about 30 to about 300.

6. The phenolic resin-extended polycarboxylic acid resin of claim 5 wherein said acid number is in the range of about 30 to about 150 and said extended polycarboxylic acid resin contains between 15 and 35 weight percent of said phenol-aldehyde resin.

7. The phenolic resin-extended polycarboxylic acid resin of claim 1 wherein the maleinized siccative hydrocarbon-comprising conjugated diene copolymer is at least partially formed while components thereof are heated with said phenol-aldehyde resin.

References Cited

UNITED STATES PATENTS

| 2,532,374 | 12/1950 | Shepard et al. | 260—846 |
| 2,634,256 | 4/1953 | Sparks et al. | 260—22 |
| 3,245,954 | 4/1966 | Bergman et al. | 260—846 |

FOREIGN PATENTS

| 756,269 | 9/1956 | Great Britain. |

OTHER REFERENCES

"The Chemistry of Phenolic Resins," Martin, John Wiley & Sons, New York, 1956, pp. 88–89.

"Phenoplast, High Polymers Vol. VII," T.S. Carswell, Interscience Publishers Inc., New York, 1947 p. 29.

SAMUEL H. BLECH, *Primary Examiner.*

MURRAY TILLMAN, *Examiner.*

J. C. BLEUTGE, *Assistant Examiner.*